(12) United States Patent
Sheynblat et al.

(10) Patent No.: US 9,367,145 B2
(45) Date of Patent: Jun. 14, 2016

(54) INTELLIGENT DISPLAY IMAGE ORIENTATION BASED ON RELATIVE MOTION DETECTION

(71) Applicant: QUALCOMM Incorporated, San Diego, CA (US)

(72) Inventors: Leonid Sheynblat, Hillsborough, CA (US); Asha Gowri Karvaje, San Jose, CA (US); Ricky Wai Kit Yuen, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/212,829

(22) Filed: Mar. 14, 2014

(65) Prior Publication Data

US 2014/0267431 A1 Sep. 18, 2014

Related U.S. Application Data

(60) Provisional application No. 61/785,047, filed on Mar. 14, 2013.

(51) Int. Cl.
*G06F 1/16* (2006.01)
*G06T 3/60* (2006.01)
*G06F 3/0346* (2013.01)

(52) U.S. Cl.
CPC ............ *G06F 3/0346* (2013.01); *G06F 1/1626* (2013.01); *G06F 2200/1614* (2013.01)

(58) Field of Classification Search
CPC ............. G09G 2340/0492; G09G 5/00; G06F 1/1626; G06F 1/1601; G06F 1/1684; G06F 2200/1614
See application file for complete search history.

(56) References Cited

U.S. PATENT DOCUMENTS

| | | | |
|---|---|---|---|
| 8,228,292 B1 | 7/2012 | Ruiz et al. | |
| 8,300,065 B2 | 10/2012 | Kim et al. | |
| 8,903,141 B2* | 12/2014 | Heilpern | G06K 9/3208 382/115 |
| 9,019,312 B2* | 4/2015 | Ishidera | G06F 3/0346 345/659 |
| 2002/0033803 A1* | 3/2002 | Holzrichter | G06F 3/012 345/158 |
| 2009/0265671 A1 | 10/2009 | Sachs et al. | |
| 2009/0322597 A1* | 12/2009 | Medina Herrero | G01S 19/34 342/357.48 |
| 2010/0001949 A1* | 1/2010 | Shkolnikov | G06F 1/1626 345/156 |
| 2011/0157231 A1 | 6/2011 | Ye et al. | |
| 2011/0310094 A1* | 12/2011 | Park | G06F 1/1626 345/419 |
| 2012/0249741 A1* | 10/2012 | Maciocci | G06F 3/011 348/46 |
| 2012/0256959 A1* | 10/2012 | Ye | G06F 3/0488 345/649 |
| 2012/0320224 A1* | 12/2012 | Miyoshi | H04N 5/217 348/207.1 |
| 2013/0044071 A1 | 2/2013 | Hu et al. | |
| 2013/0150001 A1* | 6/2013 | Chang | H04W 12/02 455/411 |
| 2014/0145930 A1* | 5/2014 | Mandella | G01B 21/04 345/156 |
| 2014/0370836 A1* | 12/2014 | Gladstone | H04M 11/04 455/404.1 |

* cited by examiner

*Primary Examiner* — Todd Buttram
(74) *Attorney, Agent, or Firm* — Linda G. Gunderson (57) ABSTRACT

Techniques for display rotation are disclosed. In one aspect, raw angular motion sensor (AMS) data can be accessed. A motion state of the mobile device can be determined based at least in part on processing the raw AMS data. AMS data can be further processed to determine whether to perform a rotation of the display image based at least in part on applying at least one pre-defined criterion to the AMS data.

20 Claims, 9 Drawing Sheets

FIG. 6

INTELLIGENT DISPLAY IMAGE ORIENTATION BASED ON RELATIVE MOTION DETECTION

CROSS-REFERENCE TO RELATED APPLICATIONS

The present Application for Patent claims the benefit of Provisional Patent Application No. 61/785,047 entitled "INTELLIGENT DISPLAY IMAGE ORIENTATION BASED ON RELATIVE MOTION DETECTION" filed Mar. 14, 2013, and assigned to the assignee hereof and hereby expressly incorporated herein by reference in its entirety.

TECHNICAL FIELD

This disclosure relates to automatic rotation of a display image on a portable electronic device.

BACKGROUND

Portable electronic devices such as smartphones and tablets have become ubiquitous in many people's lives. These devices typically incorporate a screen or visual display as an integral part of the user interface. In many situations, users will find themselves holding the phone in, or viewing the phone from, a position that makes it difficult or inconvenient to glean information from the displayed text or image. Consequently it may be highly desirable to rotate the display image, for instance from portrait to landscape orientation, to mitigate this issue and facilitate reading or interpretation of such a display image by the user.

Some available methods utilize accelerometer data to determine a change in orientation of the display. For example when the change in orientation of the device as measured by the accelerometer exceeds a certain threshold, the display image orientation may be rotated (for instance from portrait to landscape orientation or vice versa). In some available systems, accelerometer data is processed continuously whenever the display is in use, regardless of the state of motion of the device.

SUMMARY

In general, this disclosure relates to techniques for orienting a mobile device display image. One embodiment can include a method comprising accessing, by a first processor, raw angular motion sensor (AMS) data from an AMS configured to sense angular motion of a mobile device having a display capable of rendering a display image; determining a motion state of the mobile device based at least in part on the raw AMS data; in response to determining that the motion state of the mobile device is relative motion, initiating transmission of AMS data from the first processor to a second processor; and processing the AMS data by the second processor to determine whether to perform a rotation of the display image, where the determination of whether to rotate the display image is based at least in part on applying at least one pre-defined criterion to the AMS data.

Another embodiment can include an apparatus comprising: an angular motion sensor (AMS) configured to sense motion of a mobile device having a display configured to render a display image, and generate and transmit raw AMS data to a first processor, wherein the first processor is configured to: access raw angular motion sensor (AMS) data from an AMS; execute a relative motion detection (RMD) algorithm to determine a relative motion state of the mobile device, and determine whether to transmit AMS data based at least in part on a result of the RMD algorithm; and a second processor configured to receive and process the AMS data to make a determination as to whether to rotate the display image, where the determination is based at least in part on applying at least one pre-defined criterion to the AMS data.

A further embodiment can include an apparatus comprising: an angular motion sensor (AMS) configured to sense angular motion of a mobile device having a display capable of rendering a display image, and configured to generate and transmit raw AMS data to a processor, wherein the processor is configured to: access raw AMS data; execute a relative motion detection (RMD) algorithm to determine a relative state of motion of the mobile device; and make a determination as to whether to rotate the display image based at least in part on a result of a RMD algorithm.

The details of one or more examples of such methods are set forth in the accompanying drawings and the description below. Other features, objects, and advantages of the invention will be apparent from the description and drawings, and from the claims.

DETAILED DESCRIPTION

Several examples of systems employing a relative motion detection (RMD) algorithm to improve processor power efficiency in performing video image rotation are illustrated below. As used herein the terms "stream", "streaming" and variations thereof are intended to encompass sending, transmitting, etc., one or more, bits, bytes, symbols, packets or other data elements in a discreet or relatively continuous manner.

In general, this disclosure relates to techniques for orienting a mobile device display image. More specifically, this disclosure describes methods for intelligent active-only processing of angular motion sensor (AMS) data by one or more processors that may play a role in determining the display image orientation within a mobile device, for instance a digital signal processor (DSP), graphics processor or application processor, where the determination as to whether or not to process AMS data at a particular time may be based on a state of motion of the mobile device at that time. These methods can conserve power, for instance by allowing some processor domains to power collapse as described below when not processing AMS data.

As noted above, some existing display orientation techniques continuously process data from an AMS such as an accelerometer or gyroscope to determine whether to change a display image orientation. The AMS may transmit information by streaming data characteristic of different types of motion, however many or most of the motion types may have no bearing on the orientation of the display image. For instance, constant velocity with no rotation may generally not trigger a compensatory rotation of the display image. Possible states of motion may include, but are not limited to: at rest, for instance on a desk or table top; in motion, which simply means that the device is moving with respect to the earth; at relative rest, for instance moving at a constant velocity with negligible rotation; and in relative motion, which identifies a type of motion which may trigger a compensatory rotation of the display image. As such, the continuous processing of accelerometer data may constitute an inefficient use of processor resources, and the power required to continuously process AMS data may be considerable. Furthermore the amount of power available to a mobile device may be limited, e.g. by battery capacity. The foregoing considerations provide motivation to develop methods for improved efficiency. An example of a solution may be to intermittently stream or process angular momentum sensor data only when the mobile device is in a state of relative motion. However, identifying relative motion may not be trivial, and may require processing of the raw accelerometer data.

In contrast to conventional methods, the techniques described herein allow for intermittent transmission and processing of AMS data. One or more of the techniques described herein can include to cease streaming of accelerometer data to the processor or processors which may play a role in determining the display image orientation, or to cease processing such data, during times when the data is irrelevant to the display orientation task. Explicitly, when mobile device has not undergone a type of motion which might trigger rotation of the display image, the system may cease streaming or processing of the accelerometer data for this purpose. In some embodiments, AMS data for re-orienting the display image may be streamed or processed only during relatively brief intervals during which the device undergoes a motion for which a compensatory rotation of the displayed image may be of potential benefit to the user experience. This intelligent, "active-only" method of transmitting or processing of AMS data for display orientation can dramatically lower the effective power duty cycle associated with the display image orientation data transmission and processing while maintaining satisfactory performance, potentially resulting in significant power savings.

This disclosure describes methods to reduce processor power requirements for implementing mobile device display image orientation. The techniques involve the use of a relative motion detection (RMD) algorithm to process the accelerometer data to determine the motion state of a mobile device, reducing processor power consumption by, for instance, streaming accelerometer data to a processor only when the RMD algorithm detects relative motion as described below. Further gains in efficiency can be obtained with a motion interrupt feature. The motion interrupt feature signals initiation of accelerometer data streaming, for instance sending a signal to a DSP to start the flow of data from the DSP to a separate processor running the RMD algorithm, when the accelerometer registers any type of motion.

Figure 1A:
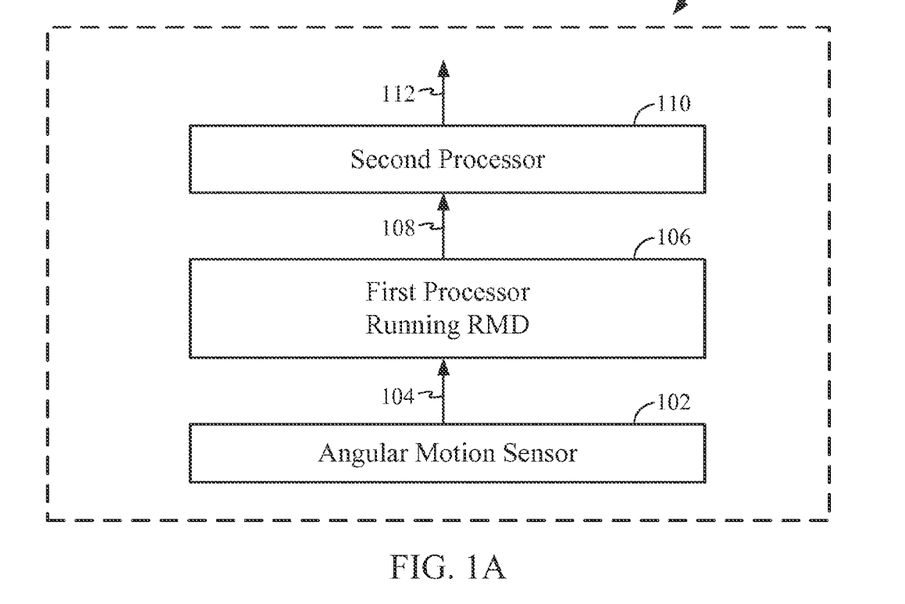
FIG. 1A, FIG. 1B, and FIG. 1C are block diagrams that each illustrate an example of a display orientation system configured to operate according to the techniques of this disclosure.

An example embodiment of this disclosure is illustrated in FIG. 1A. In this example, a first processor 106, for instance a DSP, accesses raw angular motion sensor (AMS) data 104 streaming from an AMS 102 within a mobile device 100. In some example configurations, the raw AMS data is packetized prior to transmission. The raw AMS data 104 may for instance be directly accessed (e.g. received at first processor 106 directly from the AMS 102 as streamed raw AMS data 104), accessed from storage such as a memory buffer, and/or accessed in packetized form (e.g. from storage such as a memory buffer embedded in the AMS 102, where the raw AMS data 104 is stored prior to transmission by streaming to the first processor 106). The first processor 106 runs an RMD algorithm that determines the state of motion of the mobile device 100.

Using the RMD algorithm, criteria defining states of relative rest and relative motion can be applied to the AMS data for the purpose of further determining whether a given set of motion data indicates a type of motion that may affect the video image orientation (state of relative motion, for instance when angular rotation in the plane of the screen occurs) or a type of motion unlikely to affect video image orientation (state of relative rest, for instance translation with negligible angular rotation). TABLE 1 presents examples of states of motion and how they can be detected.

TABLE 1

| MOTION STATE | EXAMPLE | DETECTED BY |
| --- | --- | --- |
| At Rest | On a tabletop | AMS |
| In Motion | In a moving car | AMS |
| At Relative Rest | At rest, or translation only with minimal rotation | RMD Algorithm |
| In Relative Motion | Exceeds an angular motion (rotation) threshold | RMD Algorithm |

If the RMD algorithm determines that the mobile device 100 is in relative motion, the first processor 106 streams AMS data 108 to a second processor 110, for instance a graphics processor or application processor. In some configurations, the first processor 106 is further configured to packetize the AMS data 108 prior to transmission. Throughout these examples herein, the term "AMS data" (e.g., 108) may assume the form of unmodified raw data, modified data, events (e.g., indication of relative motion) that trigger other processor actions, or other forms. The second processor 110 may make a determination as to whether and in what manner to re-orient the display image, based at least in part on the AMS data 108, and send an appropriate signal 112 to the display to rotate the display image. In some embodiments, sending an appropriate signal can include the associated processor (e.g., the second processor 110) performing the rotation of the display image of the mobile device. In some embodiments, the compensatory display image rotation may be, for instance, from portrait to landscape, or vice versa. In some embodiments, the display need not be in portrait or landscape orientation. For example, in an embodiment (e.g., for a device with a rounded screen), the display may be aligned based on a gravity vector and may rotate based on a determination that the device is in relative motion.

If, on the other hand, the RMD algorithm determines that the mobile device 100 is at relative rest, the first processor 106 may in response cease transmitting AMS data 108 to a second processor 110, and second processor 110 may optionally transition into a power saving mode. For example, some available modem processor integrated circuits include processing units that are partitioned into "always-on" and "collapsible" power domains. The collapsible power domains can be powered off, or "collapsed", when the processing units in the power domain are not needed. The term "collapsed" can include any type of power savings mode, such as powered off, sleep state, hibernation state, lower clock frequency, lower voltage. A power control unit within an always-on power domain powers down the collapsible power domains after going into sleep mode, and powers up these domains after waking up from sleep mode. With the approach outlined above, the processor 110 can power collapse when the device is at relative rest, resulting in significant power savings.

Figure 1B:
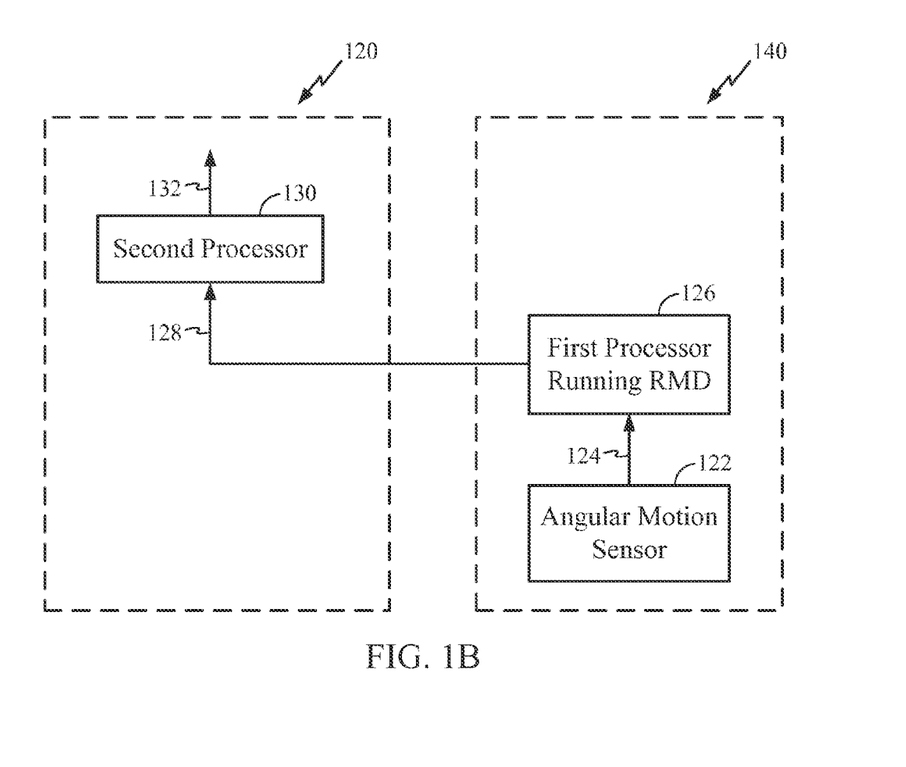

Another example embodiment of this disclosure is illustrated in FIG. 1B. In this example, by contrast, a peripheral device 140, such as a haptic sleeve to enable and/or enhance the haptic functionalities of a mobile device, or another type of peripheral device, may be employed. In such an embodiment, a first processor 126, for instance a DSP, receives raw AMS data 124 streaming from an AMS 122 within a peripheral device 140. In this example, however, the AMS 122 and the first processor 126 are in a location exterior to the mobile device 120. The first processor 126 runs an RMD algorithm that determines the state of motion of the peripheral device 140. If the RMD algorithm determines that the motion state of the peripheral device 140 is that of relative motion, the first processor 126 streams the AMS data 128 to a second processor 130, for instance a graphics processor or application processor. As noted above, the AMS data 128 may assume the form of unmodified raw data, modified data, events (e.g., indication or relative motion) that trigger other processor actions, or other forms. The second processor 130 may make a determination as to whether and in what manner to re-orient the display image, based at least in part on the AMS data 128, and send an appropriate signal 132 to the display to rotate the display image.

If, on the other hand, the RMD algorithm determines that the mobile device 120 is at relative rest, the first processor 126 may in response cease transmitting AMS data 128 to a second processor 130, and second processor 130 may optionally transition into a power saving mode as described above. With the approach outlined above, the second processor 130 can collapse when the device is at relative rest, resulting in significant power savings.

Figure 1C:
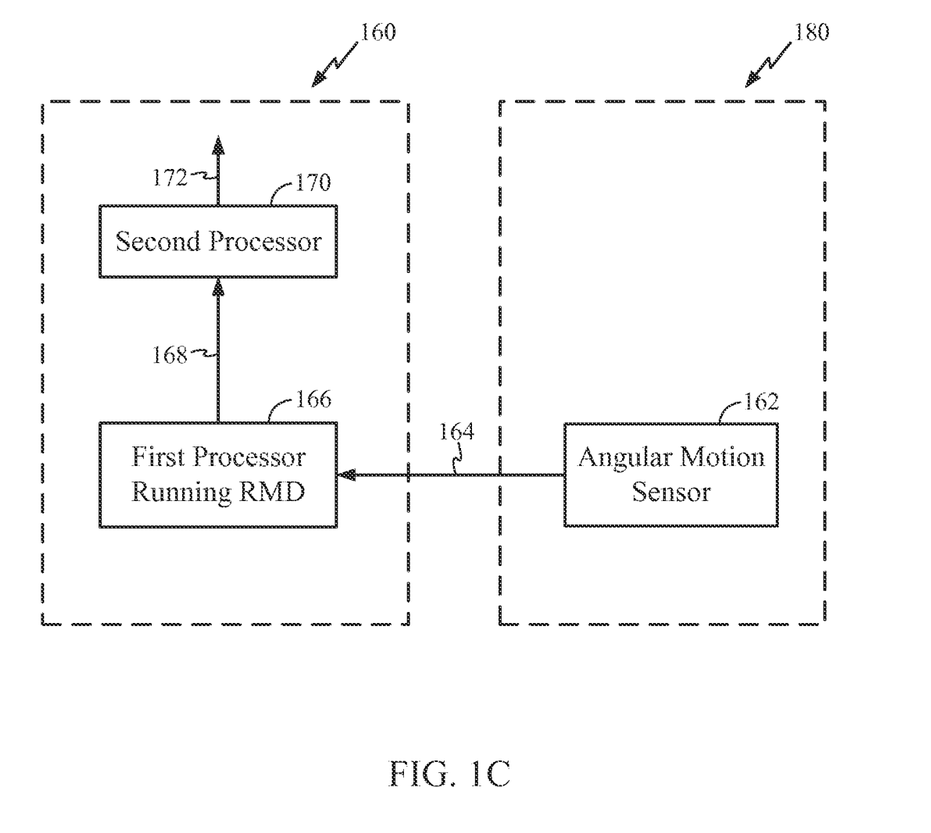

Yet another alternative embodiment is shown in FIG. 1C. The components and system in this example perform functions analogous to those of the respective components and system shown in FIG. 1B, except that the first processor 166 physically resides in the mobile device 160, rather than in the peripheral device 180 as was the case in the example of FIG. 1B.

Figure 2A:
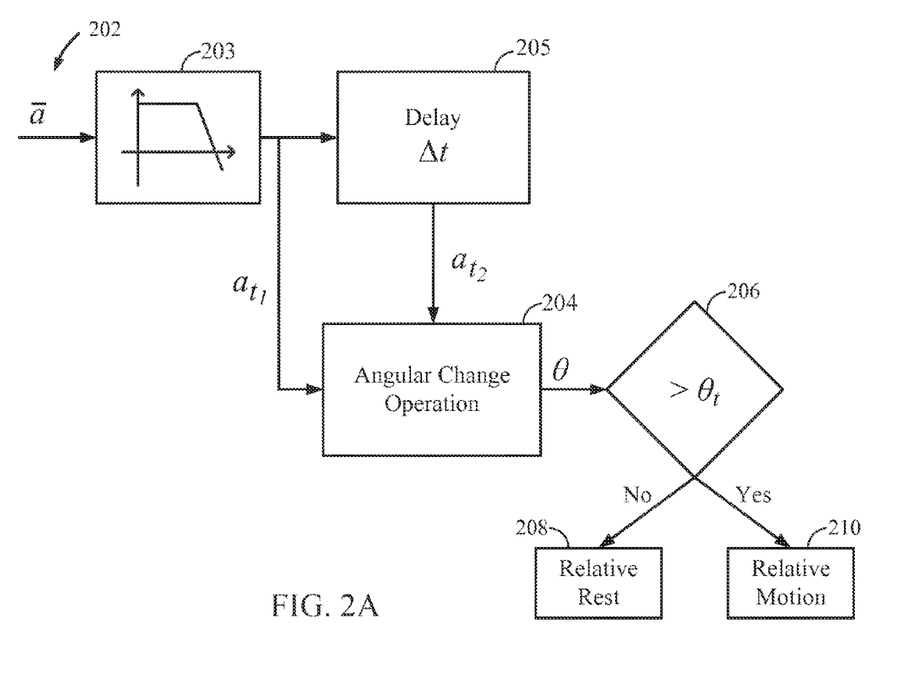
FIGS. 2A and 2B illustrate the workings of a sample relative motion detection algorithm.

Examples of one or more RMD methods are provided in the following disclosure. A measured change in an angle of a gravity vector or angular rate measurements, for example, in roll or pitch dimensions may be used to determine whether a mobile device is in a state of relative rest. FIG. 2A is a flow diagram illustrating an example method 200 for detecting or measuring an angular change in a gravity vector based, at least in part, on signals received from AMS, such as an accelerometer, for example, according to an implementation. At operation 202, the direction of a gravity vector may be monitored or sampled. For example, in one particular implementation, the direction of a gravity vector may be sampled or measured contemporaneously with measuring a level of acceleration vibration (vibration of an acceleration sensor output), such as during an observation time period correlating with an accelerometer window time. As used herein in the context of measurement signals processing, "contemporaneously" may refer to an operation or technique in which two or more measurements may originate, occur, or otherwise exist at substantially the same time. In other words, to detect a change in an angle of a measured gravity vector, accelerometer measurements with respect to the gravity vector may be sampled, for example, at points in an interval during which a measured acceleration vibration occurs, as previously mentioned. For this example, as shown, incoming accelerometer samples 202 may be filtered 203, such as by using or applying, for example, a low-pass filtering process. In one particular simulation or experiment, a gravity vector was sufficiently isolated by removing high-frequency spectra via low-pass filtering a sample signal with a 1.5 Hz second order or bi-quadratic infinite impulse response (IIR) filter. Of course, this is merely an example implementation of a low-pass filter, and claimed subject matter is not so limited. Optionally or alternatively, one or more sample signals with respect to a gravity vector may be unfiltered.

With regard to angular change operation 204, sample measurements of a gravity vector monitored, for example, by low-pass filtering an accelerometer output may be selected, and an angular change in a gravity vector may be computed. Here, selected sample measurements may comprise, for example, two sequential sample measurements $a_{t1}$ and $a_{t2}$ of a monitored gravity vector, meaning that these measurements may comprise a sequence of measurements taken at two different times, which may or may not be consecutive. For example, a first and last accelerometer samples in a memory buffer associated with a mobile device may be selected or used as sample measurements for angle computation. It will be appreciated that the examples provided herein are merely to aid in the illustration of the various techniques and should not be construed as limiting the scope of the claimed aspects.

Storage such as memory buffers may be utilized, at least in part, to collect measurement information for further transmission to a processing unit or some other component in a burst or otherwise concurrent fashion, for example. Memory buffers are known and need not be described here in greater detail. Continuing with the above example, sequential measurements $a_{t1}$ and $a_{t2}$ of a monitored gravity vector may be spaced apart or separated by some length of time or delay $\Delta t$, 205, which may correlate with an interval of a measured acceleration vibration, as was indicated. Thus, in one example implementation, delay of 0.2 seconds may be used for selecting sample measurements $a_{t1}$ and $a_{t2}$ so as to compute an angular change of a monitored gravity vector. One example of an RMD algorithm is described in U.S. application Ser. No. 13/082,294, filed Apr. 7, 2011, the entire contents of which are hereby incorporated by reference.

Figure 2B:
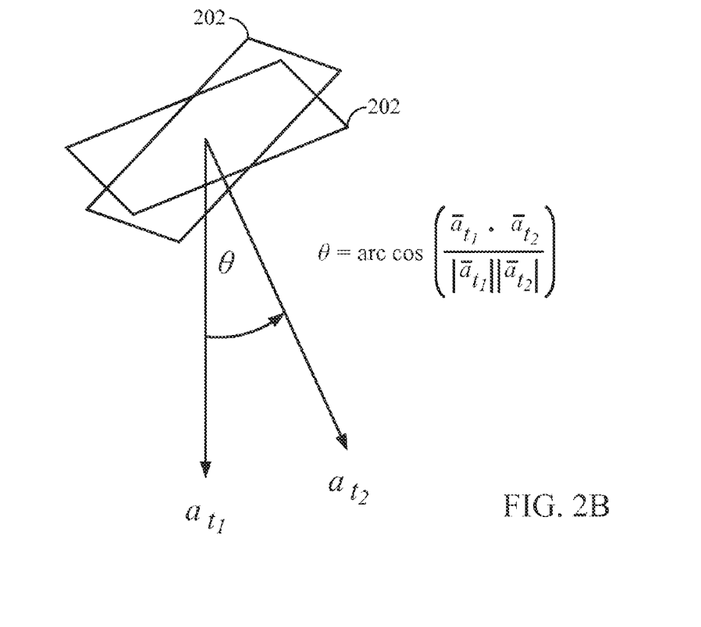

By way of example of the workings of an RMD algorithm, FIG. 2B illustrates a computation of an angular change representative of a rotation of a mobile device, for example, about gravity with respect to roll or pitch dimensions according to an implementation. As seen, here, a measured change about gravity may be defined, for example, by an angle between two sample measurements, which may be schematically represented as two sequential gravity measurements shown as vectors $a_{t1}$ and $a_{t2}$, respectively. Gravity vectors $a_{t1}$ and $a_{t2}$ may be considered, for example, in relation to any suitable or desired coordinate system. Thus, an angular change representative of a rotation of a mobile device about gravity during an observation period or between t1 and t2 may, for example, be computed as:

$$\theta = \arccos\left(\frac{\bar{a}_{t1} \cdot \bar{a}_{t2}}{|\bar{a}_{t1}||\bar{a}_{t2}|}\right) \quad (1)$$

Referring back to FIG. 2A, as seen, at operation 206, a computed angle θ may be compared against a pre-defined rotation or angular change threshold θt. If a computed angle θ exceeds such a rotation threshold θt, the mobile device may infer, relative motion 210, that is it is not at relative rest 208 and that motion has taken place between, for example, t1 and t2, just to illustrate one possible implementation. Thus, here, a stationary state with respect to rotation of the mobile device, e.g. a state of relative rest 208, may be inferred, for example, if a computed angle θ between two sequential gravity vectors $a_{t1}$ and $a_{t2}$ is less than rotation threshold. Some examples may measure angular rotation in at least one direction, in which at least one pre-defined criterion such as rotation threshold θt may be applied to determine whether an angular rotation threshold has been met.

By way of example but not limitation, a threshold of $$\frac{11.5}{180.0}\pi$$

or 0.2 radians may prove beneficial in determining rotation detection in connection, for example, with a threshold applied to a measured level of acceleration vibration for determining whether the mobile device is at rest. In some examples, threshold angles in the range of 0.1 radians<θt<0.3 radians may be used. In other examples, threshold angles in the range of $$\frac{5}{180}\pi < \theta < \frac{20}{180}\pi$$

radians radians can be employed. Of course, these are merely examples of threshold values that may be used for rotation detection. In addition, one or more threshold values may be user-configurable and may be based, at least in part, on a particular mobile environment, application, or the like.

Figure 3A:
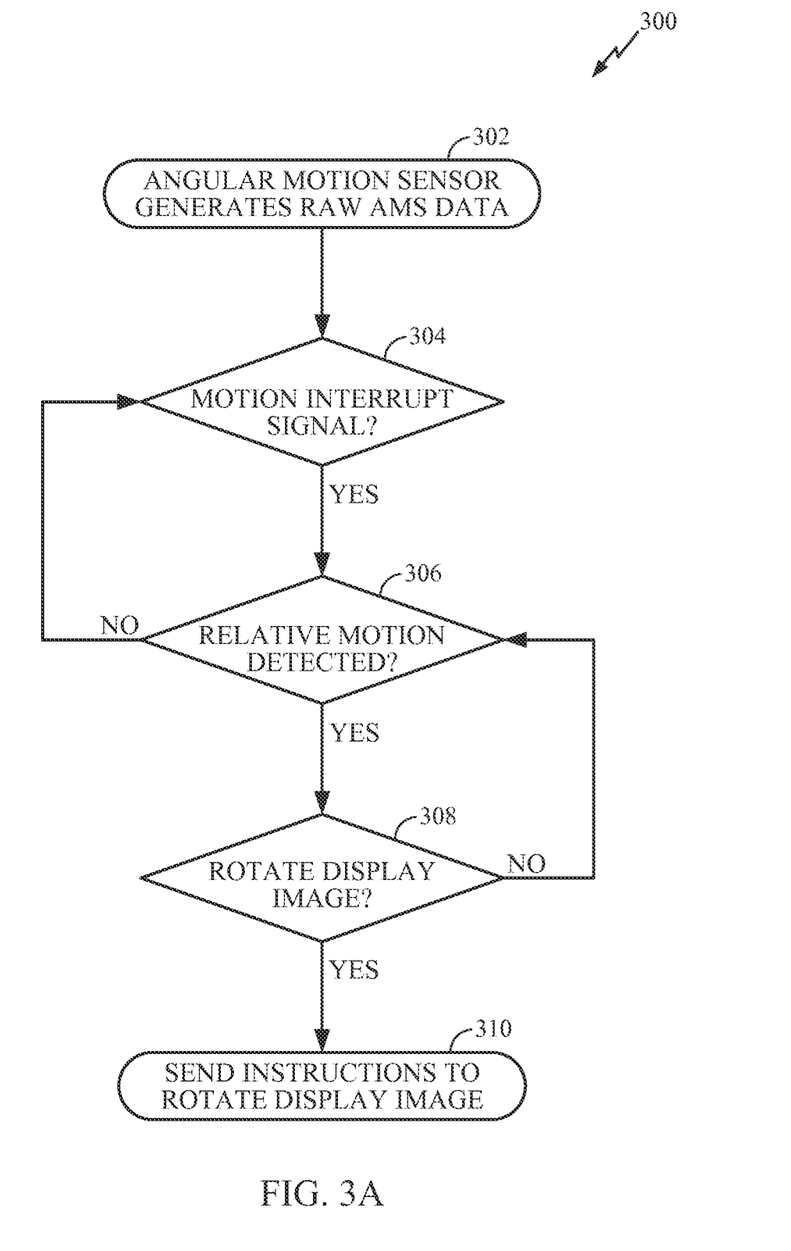
FIG. 3A is a flow diagram that illustrates an example of a display orientation system configured to operate according to the techniques of this disclosure.

A flow chart 300 illustrating an example of a method described in this disclosure is shown in FIG. 3A. In this example, AMS 302 may optionally be configured to generate a motion interrupt signal to a processor, for example a DSP, when the AMS 302 senses motion, such as described in at least one example below. In the event that the sensor is so configured, if a motion interrupt signal is detected 304 then data from the AMS 302 may be transmitted to and/or accessed by the processor running the RMD algorithm 306, for instance to an application processor via streaming, if a separate processor is employed. Alternatively the functions of the DSP and the applications processor may be combined in a single processor per some of the embodiments described for instance in FIGS. 5A and 5B below. Regardless of whether a separate processor is used, the RMD algorithm 306 determines whether the device is in a state of relative rest, or a state of relative motion. In response to detecting relative motion, the processor may perform further processing to determine whether criteria for a compensatory display image rotation have been met 308, and send instructions 310 to perform the display image rotation when said criteria have been met.

Figure 3B:
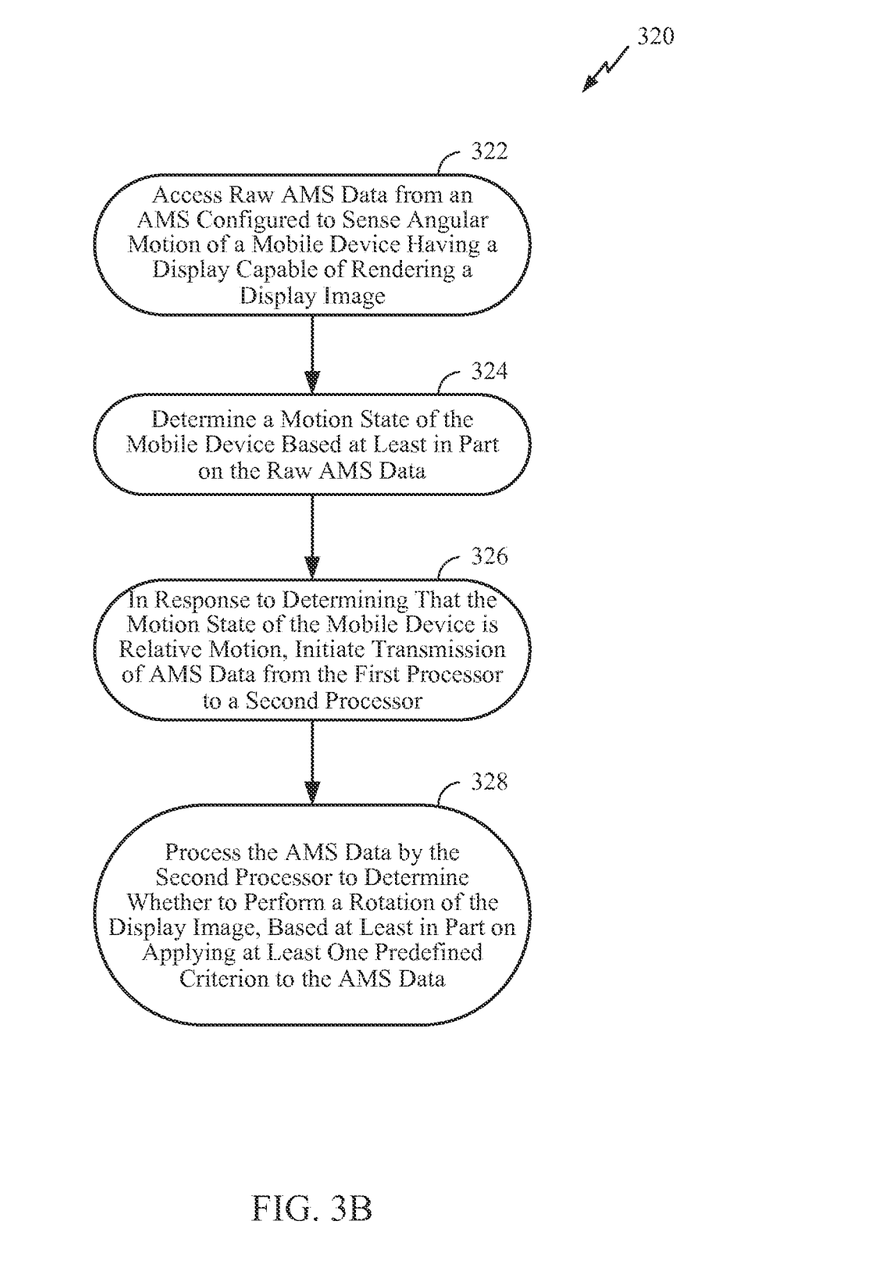
FIG. 3B is a flow diagram that illustrates an example of a display orientation system configured to operate according to the techniques of this disclosure.

A flow chart 320 illustrating an example of a method described in this disclosure is shown in FIG. 3B. At 322, a first processor accesses raw AMS data from an AMS configured to sense angular motion of a mobile device having a display capable of rendering a display image. At 324, a motion state of the mobile device is determined based at least in part on the raw AMS data. At 326, in response to determining that the motion state of the mobile device is relative motion, transmission of AMS data from the first processor to a second processor is initiated. At 328, the second processor processes the AMS data to determine whether to perform a rotation of the display image, where the determination of whether to rotate the display image is based at least in part on applying at least one pre-defined criterion to the AMS data. It will be appreciated that the pre-defined criterion can include a various aspects, such as, a pre-defined rotation or angular change threshold being exceeded based on the AMS data.

Figure 4A:
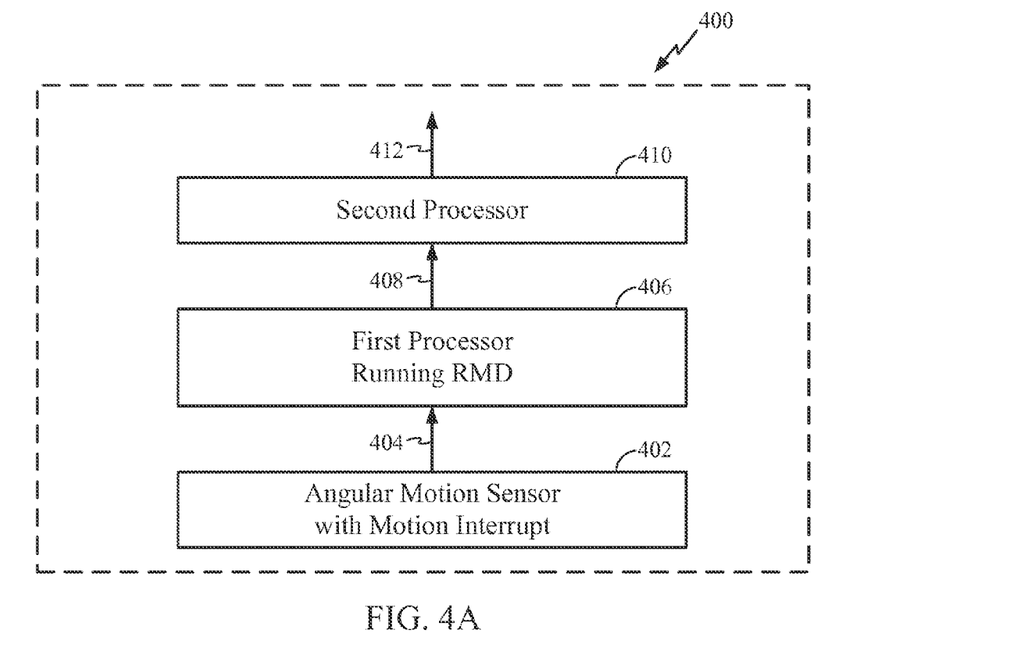
FIG. 4A, FIG. 4B, and FIG. 4C are block diagrams that each illustrate an example of a display orientation system configured to operate according to the techniques of this disclosure.
Figure 4B:
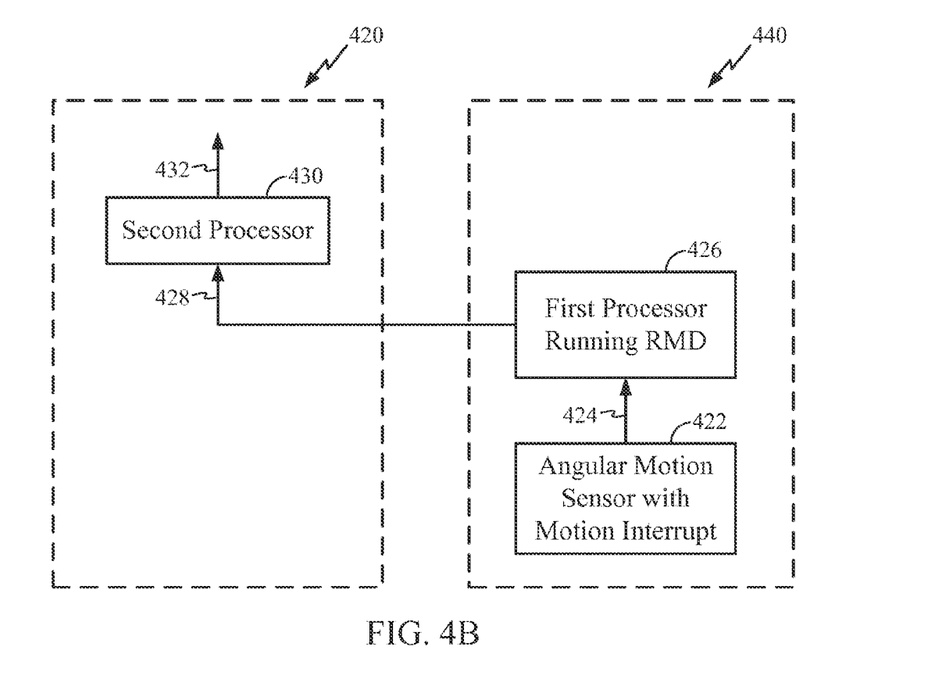
Figure 4C:
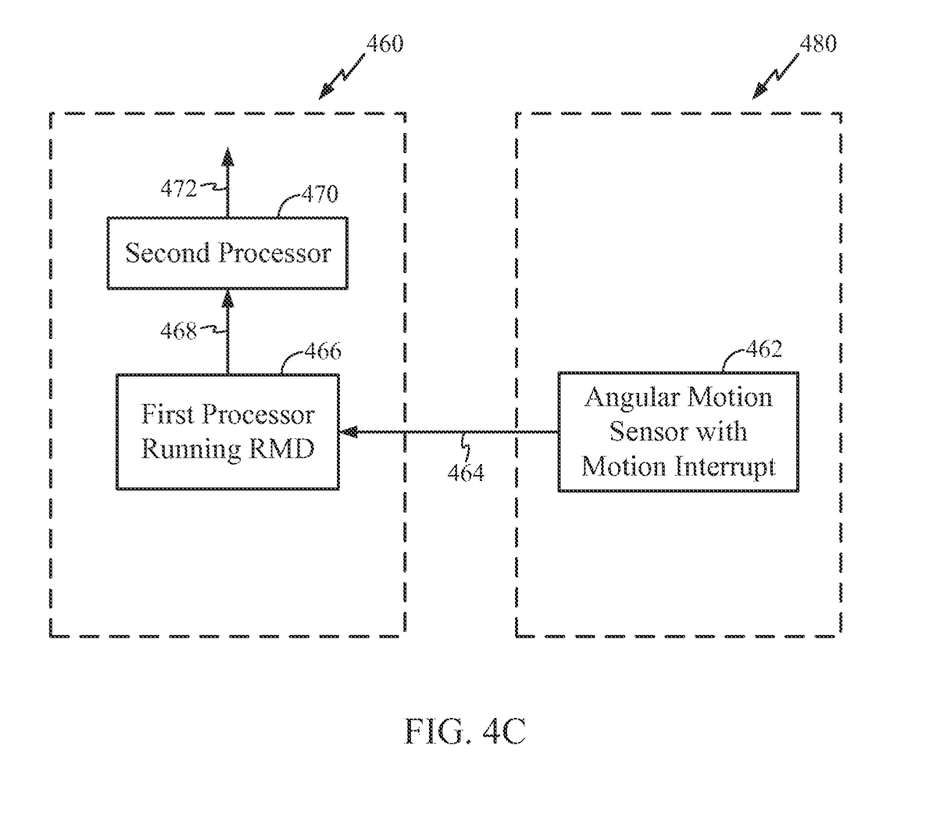

The embodiments shown in FIG. 4A, FIG. 4B, and FIG. 4C augment the examples of FIG. 1A, FIG. 1B, and FIG. 1C with a motion interrupt feature for further power savings.

With reference to FIG. 4A, a block diagram of an embodiment 400 according to an aspect is illustrated. The AMS 122 of the example in FIG. 1A may be further equipped with a motion interrupt feature as depicted 402. In this example, a first processor 406, for instance a DSP, accesses raw AMS data 404 streaming from an AMS 402 within a mobile device 400.

In this example, the AMS 402 may be equipped with a motion interrupt pin or other structure for generating a signal indicating when motion is detected (e.g., the mobile device 400 transitions from a state of rest to a state of motion). For example, the motion interrupt signal may provide a simple indication as to whether the mobile device is in motion or at rest, and may not make a further determination of relative motion. The motion interrupt signal may be transmitted to the first processor 406. When the mobile device 400 transitions from a state of rest to a state of motion, the motion interrupt may signal the initiation of the transmission and/or acquisition of raw AMS data 404 to the first processor 406. The first processor 406 may access the raw AMS data 404 and run an RMD algorithm that determines the state of motion of the mobile device 400. If the RMD algorithm determines that the motion state of the mobile device is relative motion, the first processor 406 may stream the AMS data 408 to a second processor 410, for instance a graphics processor or application processor. As noted above, the AMS data may assume the form of unmodified raw data, modified data, events (e.g., indication of relative motion) that trigger other processor actions, or other forms. The second processor 410 may make a determination as to whether and in what manner to re-orient the display image, based at least in part on the AMS data 408 and may send an appropriate signal 412 to the display to rotate the display image. Using this method, the flow of data from the AMS 402 to the first processor 406 is halted when the mobile device 400 transitions from a state of motion to a state of rest, thereby realizing further power savings in the first processor 406.

With reference to FIG. 4B, a block diagram of another embodiment according to an aspect is illustrated. Analogous to the previous example, the AMS 122 of the example in FIG. 1B may be further equipped with a motion interrupt feature as depicted 422. In this example, by contrast, a peripheral device 440, such as a haptic sleeve to enable and/or enhance the haptic functionalities of a mobile device, or another type of peripheral device, may be employed. In such an embodiment, a first processor 426, for instance a DSP, may access raw AMS data 424 from an AMS 422 outside a mobile device 420.

In this example, the first processor 426 may be in a location exterior to the mobile device 420. The AMS 422 may be equipped with a motion interrupt pin or other structure for generating a signal indicating whether the mobile device 420 is at rest or in motion. The motion interrupt signal may be transmitted to the first processor 426. When the mobile device 420 transitions from a state of rest to a state of motion, the motion interrupt may signal the initiation of the transmission and/or acquisition of raw AMS data 424 to the first processor 426. The first processor 426 may access the raw AMS data 424 and run an RMD algorithm that determines the state of motion of the mobile device 420. If the RMD algorithm determines that the motion state of the mobile device is in relative motion, the first processor 426 may stream the AMS data 428 to a second processor 430, for instance a graphics processor or application processor. The second processor 430 may make a determination as to whether and in what manner to re-orient the display image, based at least in part on the AMS data 428, and may send an appropriate signal 432 to the display to rotate the display image. Using this method, the flow of raw AMS data 424 from the AMS 422 to the first processor 426 can be halted when the mobile device 420 transitions from a state of motion to a state of rest, thereby realizing further power savings in the first processor 426.

Yet another alternative embodiment is shown in FIG. 4C. The components and system in this example perform functions analogous to those of the respective components and system shown in FIG. 4B, except that the first processor 466 physically resides in the mobile device 460, rather than in the peripheral device 480 as was the case in the example of FIG. 4B.

Figure 5A:
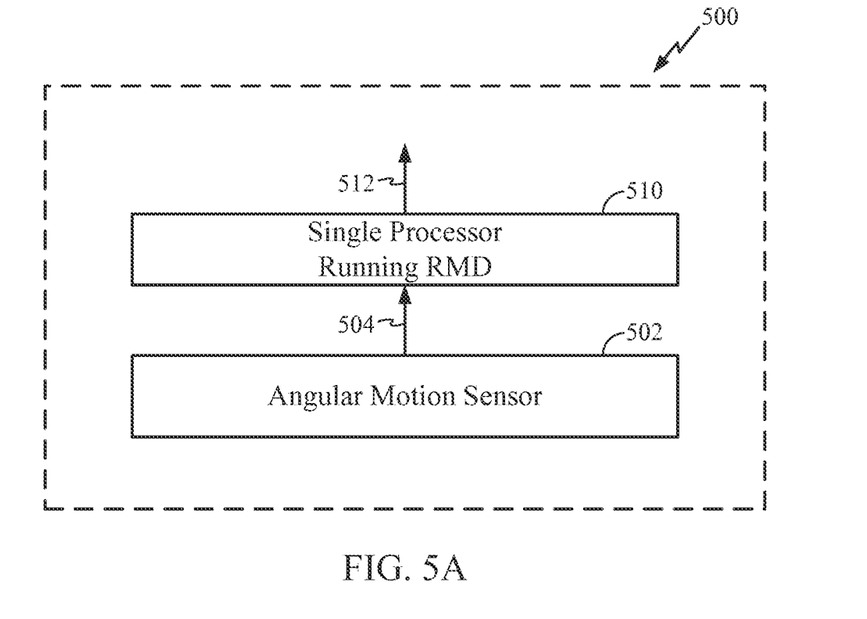
FIG. 5A and FIG. 5B are block diagrams that each illustrate an example of a display orientation system configured to operate according to the techniques of this disclosure.
Figure 5B:
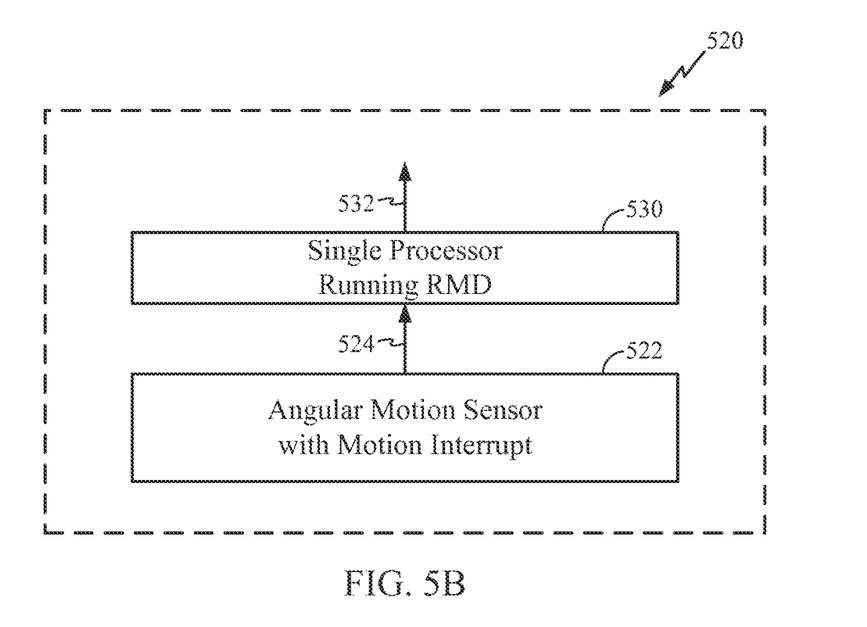

Further examples of embodiments of this disclosure are shown in FIG. 5A and FIG. 5B. In these example configurations, the functions of the two separate processors may be combined into a single processor, either with or without the motion interrupt feature.

An example embodiment of this disclosure is illustrated in FIG. 5A. In this example, a processor 510 may, for instance, combine various functions of a DSP and an application processor. More generically, the processor 510 may, for example, combine various functions of the first processor 106 and the second processor 110 of FIG. 1A, and may access raw AMS data 504 streaming from an AMS 502 within a mobile device 500. The processor 510 runs an RMD algorithm that determines the state of motion of the mobile device. If the RMD algorithm determines that the motion state of the mobile device 500 is relative motion, the processor 510 may make a further determination as to whether and in what manner to re-orient the display image, based at least in part on the raw AMS data 504, and may send a signal 512 to the display to rotate the display image.

Another example embodiment of this disclosure is illustrated in FIG. 5B. As in the previous example, a processor 530 which may, for instance, combine various functions of a DSP and an application processor, may access raw AMS data 524 streaming from an AMS 522 within a mobile device 520. The AMS 522 within mobile device 520 may be further equipped with a motion interrupt pin or other structure for generating a signal indicating whether the mobile device 520 is at rest or in motion. The motion interrupt signal may be transmitted to the processor 530.

When the mobile device 520 transitions from a state of rest to a state of motion, the motion interrupt may signal the initiation of the transmission and/or acquisition of raw AMS data 524 to the processor. The processor 530 runs an RMD algorithm that determines the state of motion of the mobile device. If the RMD algorithm determines that the motion state of the mobile device is in relative motion, the processor 530 may make a determination as to whether and in what manner to re-orient the display image, based at least in part on the raw AMS data 504, and may send an appropriate signal 532 to the display to rotate the display image. Using this method, the flow of data from the AMS 522 to the processor 530 can be halted when the mobile device transitions from a state of motion to a state of rest, thereby realizing further power savings in the processor 530.

Figure 6:
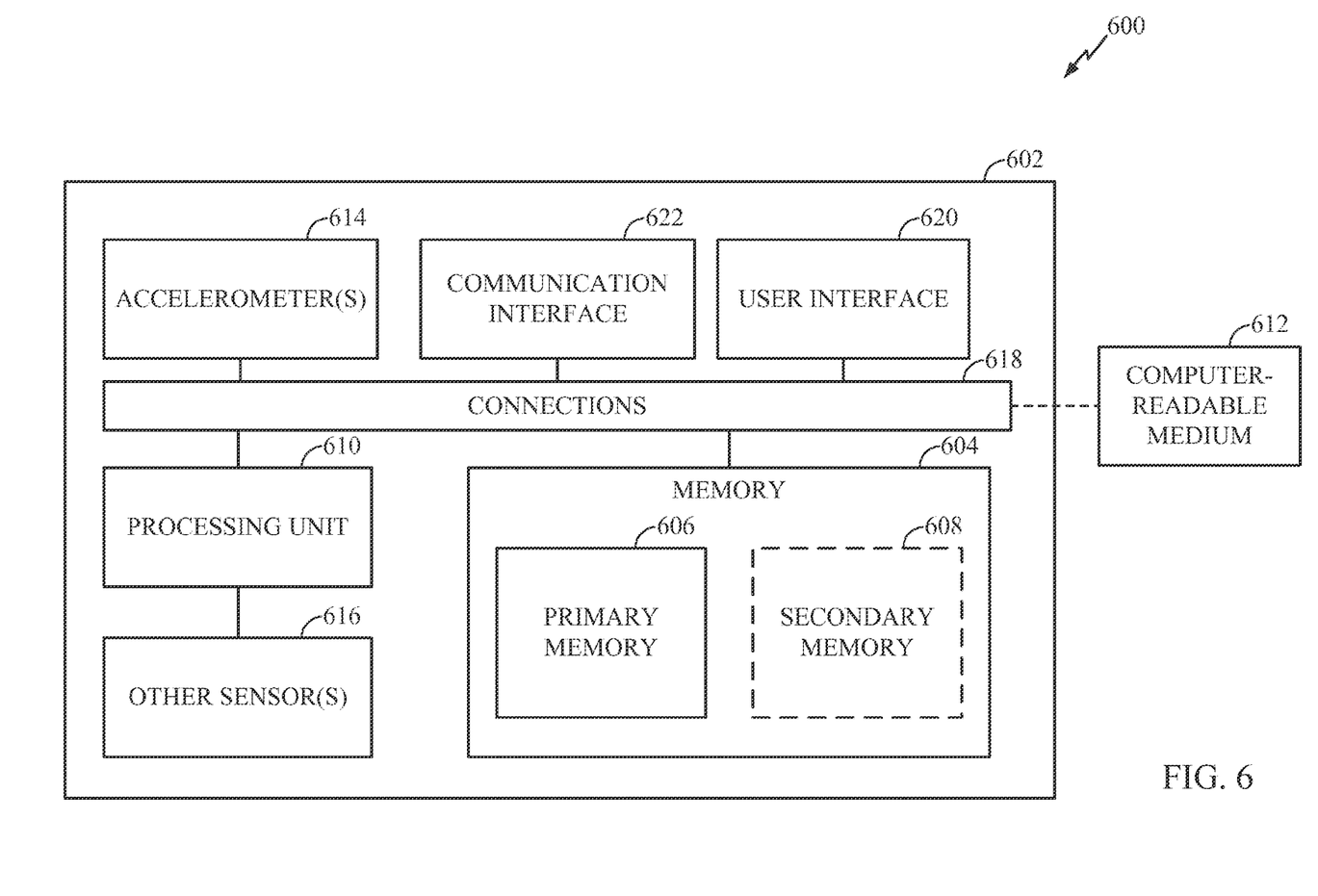
FIG. 6 is a block diagram showing a system configured to operate according to the techniques of this disclosure.

FIG. 6 is a block diagram showing a system 600 configured to operate according to the techniques of this disclosure. As illustrated in FIG. 6, an apparatus 602 includes a memory 604, a processing unit 610, one or more accelerometers 614, and optionally one or more other sensors 616. The memory 604 includes a primary memory 606 and a secondary memory 608, which each of which may include some or all instructions executable by the processing unit 610 to perform the methods described herein. The apparatus 602 also includes a user interface 620, which may include a display and a communication interface 622. Connections 618 enable communication among the various components of the apparatus 602. A computer-readable medium 612 in communication with apparatus 602 via connections 618 may be a separate unit or integrated into the apparatus 602. Further, computer-readable medium 612 may also, or alternatively, include instructions executable by the processing unit 610 to perform the methods described herein.

One of ordinary skill in the art will appreciate that the methods set forth herein are not restricted to the examples used in illustration, and that these methods may apply to other applications where processor power could be conserved based on the state of motion of the device such as automatic call blocking, gesture recognition, orientation detection for virtual reality and gaming 3D user position feedback, activity analysis such as pedometer step counting, and other applications where intelligent processing of motion sensor data may prove advantageous.

In one or more example embodiments, the functions and processes described may be implemented in hardware, software, firmware, or any combination thereof. If implemented in software, the functions may be stored as one or more instructions or code on a computer-readable medium. Computer-readable media includes a physical computer storage media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks store data magnetically or optically. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Where methods or functions involve more than one processor, the plurality of processors may be physically collocated on the same chip within the same device, located on separate chips within the same device, or located in two separate devices, for instance a mobile device and a peripheral device. Any machine readable medium tangibly embodying instructions may be used in implementing the methodologies described herein. For example, software codes or instructions may be stored in a memory, for example the memory of mobile station, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. The phrase, "computer readable medium" does not refer to a transitory propagating signal. The word "code" as used herein refers to stored instructions and does not refer to software per se.

Moreover, the previous description of the disclosed implementations is provided to enable any person skilled in the art to make or use the various embodiments. Various modifications to these implementations will be readily apparent to those skilled in the art, and the generic principles defined herein may be applied to other implementations without departing from the spirit or scope of the claimed aspects. The functions, steps and/or actions of the method claims in accordance with the various aspects described herein need not be performed in any particular order. Furthermore, although elements may be described or claimed in the singular, the plural is contemplated unless limitation to the singular is explicitly stated. Thus, the claimed aspects are not intended to be limited to the features shown herein but are to be accorded the widest scope consistent with the principles and novel features disclosed here.

What is claimed is:

1. A method comprising:
    accessing, by a first processor, raw angular motion sensor (AMS) data from an AMS configured to sense angular motion of a mobile device having a display capable of rendering a display image;
    determining a state of motion of the mobile device based at least in part on the raw AMS data;
    in response to determining that the state of motion of the mobile device is a state of relative motion, initiating transmission of AMS data from the first processor to a second processor; and
    processing the AMS data by the second processor to determine whether to perform a rotation of the display image, where the determination of whether to rotate the display image is based at least in part on applying at least one pre-defined criterion to the AMS data.

2. The method of claim 1, further comprising, in response to determining that the at least one pre-defined criterion has been met, execution of instructions by the second processor to perform the rotation of the display image of the mobile device.

3. The method of claim 2, where the rotation of the display image is either from landscape to portrait orientation, or from portrait to landscape orientation.

4. The method of claim 1, wherein the determining the state of motion of the mobile device based at least in part on the raw AMS data further comprises determining the state of motion using a relative motion detection (RMD) algorithm.

5. The method of claim 4, wherein determining the state of motion of the mobile device comprises determining the state of motion of the mobile device from a plurality of possible states of motion selected from the group consisting of: at rest, in motion, at relative rest, and in relative motion.

6. The method of claim 1, further comprising halting the accessing of the raw AMS data from the AMS by the first processor in response to the mobile device transitioning from a state of motion to a state of rest.

7. The method of claim 6, further comprising receiving a motion interrupt signal at the first processor to initiate the accessing of the raw AMS data by the first processor in response to the mobile device transitioning from the state of rest to the state of motion.

8. An apparatus comprising:
    a first processor configured to:
        access raw angular motion sensor (AMS) data from an AMS,
        execute a relative motion detection (RMD) algorithm to determine that a state of motion of the mobile device is a state of relative motion, and
        determine whether to initiate a transmission of AMS data based at least in part on a result of the RMD algorithm; and
    a second processor configured to:
        receive and process the AMS data to make a determination as to whether to rotate a display image on a display of the mobile device, where the determination is based at least in part on applying at least one pre-defined criterion to the AMS data.

9. The apparatus of claim 8, wherein the second processor is further configured to rotate the display image from landscape to portrait orientation, or from portrait to landscape orientation, in response to the determination that the at least one pre-defined criterion has been met.

10. The apparatus of claim 8, wherein the first processor is configured to determine the relative state of motion of the mobile device based at least in part on the raw AMS data.

11. The apparatus of claim 8, wherein the first processor is configured to determine the state of motion of the mobile device from a plurality of possible states of motion selected from the group consisting of: at rest, in motion, at relative rest, and in relative motion.

12. The apparatus of claim 8, wherein the AMS is configured to:
    sense a motion of the mobile device; and
    generate and transmit the raw AMS data to the first processor.

13. The apparatus of claim 12, wherein the AMS is further configured to send a motion interrupt signal to the first processor.

14. The apparatus of claim 12, wherein the first processor and/or the AMS is located in a haptic sleeve or other peripheral device.

15. An apparatus comprising:
    a first processor;
    an angular motion sensor (AMS) configured to sense angular motion of a mobile device having a display capable of rendering a display image, and configured to generate and transmit raw AMS data to the first processor, wherein the first processor is configured to:
    access the raw AMS data from the AMS;
    execute a relative motion detection (RMD) algorithm to determine that a state of motion of the mobile device is a state of relative motion; and make a determination as to whether to initiate a transmission of AMS data to a second processor based at least in part on a result of the RMD algorithm.

16. The apparatus of claim 15, wherein the second processor is further configured to rotate the display image, from landscape to portrait orientation, or from portrait to landscape orientation, in response to a determination that a pre-defined rotation or angular change threshold is exceeded.

17. The apparatus of claim 15, wherein the first processor is configured to determine the state of motion of the mobile device from a plurality of possible states of motion selected from the group consisting of: at rest, in motion, at relative rest, and in relative motion.

18. The apparatus of claim 15, wherein the AMS is configured to halt transmission of the raw AMS data to the first processor when the mobile device transitions from a state of motion to a state of rest.

19. The apparatus of claim 18, wherein the AMS is further configured to send a motion interrupt signal to the first processor and to initiate transmission of the raw AMS data when the mobile device transitions from the state of rest to the state of motion.

20. The apparatus of claim 19, wherein the AMS is located in a haptic sleeve or other peripheral device.

* * * * *